(12) United States Patent
Hrudka

(10) Patent No.: US 8,252,353 B2
(45) Date of Patent: Aug. 28, 2012

(54) CUSTOM FOOD PRODUCT PREPARATION APPARATUS

(76) Inventor: Brian Hrudka, Chapel Hill, NC (US)

( * ) Notice: Subject to any disclaimer, the term of this patent is extended or adjusted under 35 U.S.C. 154(b) by 183 days.

(21) Appl. No.: 12/831,464

(22) Filed: Jul. 7, 2010

(65) Prior Publication Data

US 2010/0274676 A1  Oct. 28, 2010

Related U.S. Application Data

(62) Division of application No. 11/564,670, filed on Nov. 29, 2006, now Pat. No. 7,776,372.

(51) Int. Cl.
*A47F 3/00* (2006.01)

(52) U.S. Cl. .......... 426/231; 426/523; 426/518; 99/357; 99/484; 705/15; 705/17; 705/20; 705/23; 705/24; 705/22; 312/140.2

(58) Field of Classification Search .......... 426/231–233, 426/523, 518; 99/357, 484; 705/15–24; 312/140.1–140.4
See application file for complete search history.

(56) References Cited

U.S. PATENT DOCUMENTS

| | | | |
|---|---|---|---|
| D175,858 S | 10/1955 | Hunt et al. | |
| 2,812,415 A * | 11/1957 | Markowitz | 219/393 |
| D185,939 S | 8/1959 | Frick | |
| 3,020,113 A | 2/1962 | Molitor | |
| 3,038,986 A * | 6/1962 | Molitor | 219/387 |
| 3,091,815 A * | 6/1963 | Krawiec | 52/31 |
| 3,748,437 A * | 7/1973 | Keeshin et al. | 219/214 |
| D268,537 S | 4/1983 | Craig et al. | |
| 4,974,502 A * | 12/1990 | Murdock | 99/426 |
| 5,121,677 A | 6/1992 | Le Claire et al. | |
| D341,457 S | 11/1993 | Johnson et al. | |
| 5,591,261 A * | 1/1997 | Ciaramita | 118/13 |
| 5,937,386 A * | 8/1999 | Frantz | 705/15 |
| 5,960,709 A * | 10/1999 | Yip | 99/510 |
| 5,997,924 A | 12/1999 | Olander, Jr. et al. | |
| 5,997,928 A * | 12/1999 | Kaish et al. | 426/418 |
| 6,115,695 A * | 9/2000 | Kern | 705/23 |
| 7,536,868 B1 * | 5/2009 | Ward | 62/237 |
| 7,937,289 B2 * | 5/2011 | Bodin et al. | 705/22 |
| 2002/0004749 A1 | 1/2002 | Froseth et al. | |
| 2003/0139937 A1 | 7/2003 | Lee | |
| 2005/0160005 A1 | 7/2005 | Roth et al. | |
| 2007/0254080 A1 * | 11/2007 | Schackmuth et al. | 426/523 |
| 2008/0071618 A1 * | 3/2008 | Weisz et al. | 705/14 |
| 2008/0086381 A1 * | 4/2008 | Fisher | 705/15 |
| 2011/0185919 A1 * | 8/2011 | Yglesias | 99/443 R |

\* cited by examiner

*Primary Examiner* — Drew E Becker
(74) *Attorney, Agent, or Firm* — Myers Bigel Sibley & Sajovec, P.A.

(57) ABSTRACT

Custom food product methods and apparatus are provided that allow customers to participate in the preparation of food products as a part of the dining experience. A method of preparing a custom food product under the direction of a customer includes placing a customer-selected substrate on a scale of custom food product preparation table, placing customer-selected ingredients on the substrate in customer-selected amounts and customer-selected areas, and calculating and displaying the cost of the custom food product to the customer as the customer-selected ingredients are placed on the substrate. Each ingredient is assigned a cost per unit of weight and, as the ingredients are utilized, the cost of the food product is calculated and displayed via a display associated with the table. A customer may be provided with a record of the ingredients of the custom food product and may include an image and/or name of the custom food product.

6 Claims, 3 Drawing Sheets

CUSTOM FOOD PRODUCT PREPARATION APPARATUS

RELATED APPLICATION

This application is a divisional application of U.S. patent application Ser. No. 11/564,670 filed Nov. 29, 2006 now U.S. Pat. No. 7,776,372, which is incorporated herein by reference in its entirety.

FIELD OF THE INVENTION

The present invention relates generally to food, and more particularly to food preparation methods and apparatus.

BACKGROUND OF THE INVENTION

Customers going out for pizza may have different ideas about the "perfect" pizza. Even when there are many topping choices, a pizza may not emerge as a customer has envisioned because the waitperson and/or the pizza chef interpreted the customer's order differently from what the customer envisioned. For example, one person's "heavy" topping may be "light" to another person, etc. Moreover, conventional pizza restaurants may not allow customers to customize the ingredients of a pizza beyond a few set of options. As such, when a group of customers share a pizza they may not always get the ingredients they want individually.

Additionally, pizza toppings tend to be limited to traditional, basic ingredients (e.g., pepperoni, mushrooms, onions, etc.). Increasingly, consumers are interested in more ingredients and topping choices. However, these toppings are not being offered because they do not have widespread appeal, and/or because they can be more costly to offer than "traditional toppings. In addition, most pizza restaurants add toppings which were prepared hours, perhaps days, before being used. As such, freshness of ingredients may not be what customers expect or desire.

Accordingly, there is a need for improved ways of allowing customers to customize food products, such as pizzas. Moreover, there is a need for improved ways of offering fresher ingredients as well as exotic ingredients for food products, such as pizzas.

SUMMARY OF THE INVENTION

Custom food product methods and apparatus are provided that allow customers to participate in the preparation of food products as a part of the dining experience. According to some embodiments of the present invention, a mobile, custom food product preparation table includes a scale having a food preparation surface and a plurality of storage compartments containing ingredients necessary to prepare a custom food product. The scale is configured to weigh ingredients placed on the food preparation surface (and on a substrate placed on the food preparation surface) and is in communication with a data processor that is configured to calculate the cost of a custom food product based on the type and weight of ingredients used in preparing the custom food product. A display in communication with the data processor displays, in real time, the cost of a custom food product as ingredients are placed on the food preparation surface.

According to some embodiments of the present invention, one or more of the table storage compartments may include a sensor that is configured to detect when an ingredient amount in the storage compartment drops below a threshold amount. Each sensor is in communication with the data processor and the data processor is configured to send an electronic message to an inventory location that an ingredient needs to be replenished in a particular storage compartment.

According to some embodiments of the present invention, a custom food product preparation table may include a food processing device (e.g., power operated, hand operated, etc.) that can be used to slice, chop, shred or dice ingredients immediately before they are added to a custom food product being prepared.

According to some embodiments of the present invention, a custom food product preparation table may include an elevated rack that is configured to support unprocessed ingredients such as whole pepperoni sausages, cheese wheels, etc., hanging therefrom.

According to some embodiments of the present invention, a method of preparing a custom food product under the direction of a customer includes placing a customer-selected substrate on a scale of custom food product preparation table, placing customer-selected ingredients on the substrate in customer-selected amounts and customer-selected areas, and calculating and displaying the cost of the custom food product to the customer as the customer-selected ingredients are placed on the substrate. For example, if the custom food product is a pizza, the customer selects whatever ingredients he/she desires and directs a waitperson attending the customer how and where to distribute the ingredients on the pizza crust. Each ingredient is assigned a cost per unit of weight and, as the ingredients are placed on a pizza crust, the cost of the pizza is calculated and displayed via a display associated with the table.

If a custom food product requires cooking, the custom food product preparation table is moved to an oven, for example, and the custom food product is inserted within the oven and cooked. The cooked food product is then returned to the customer.

According to some embodiments of the present invention, the customer may be provided with a record of the composition of ingredients of the custom food product. The record may include an image of the custom food product and may include a name selected by the customer.

According to some embodiments of the present invention, a restaurant includes a dining area having a plurality of dining tables and an oven located therewithin. A mobile custom food product preparation table is movable between the dining tables and the oven. Custom food products are prepared on the custom food product preparation table at a dining table and under the direction of customers at the dining table. A cashier or other station is in communication with the custom food product preparation table and is configured to provide a customer with a record of a custom food product that includes a list of customer-selected ingredients in a custom food product and/or an image of the custom food product.

According to some embodiments of the present invention, a method of preparing a custom food product under the direction of a customer, includes the following steps: rolling a table to a customer; placing a substrate on the table; preparing (e.g., slicing, chopping, dicing, etc.) certain ingredients; weighing customer-selected ingredients and placing the customer-selected ingredients on the substrate to create a custom food product under customer direction; tallying a price of the custom food product based on the customer-selected ingredients and weight of the customer-selected ingredients; rolling the table to an oven; cooking the custom food product; and returning the cooked custom food product to the customer. The substrate can be a plate or other container, and can be a comestible base, such as a pizza crust or other type of dough.

For example, the custom food product is may be a pizza and the comestible base is a pizza crust.

DETAILED DESCRIPTION OF EMBODIMENTS OF THE INVENTION

Figure 1:
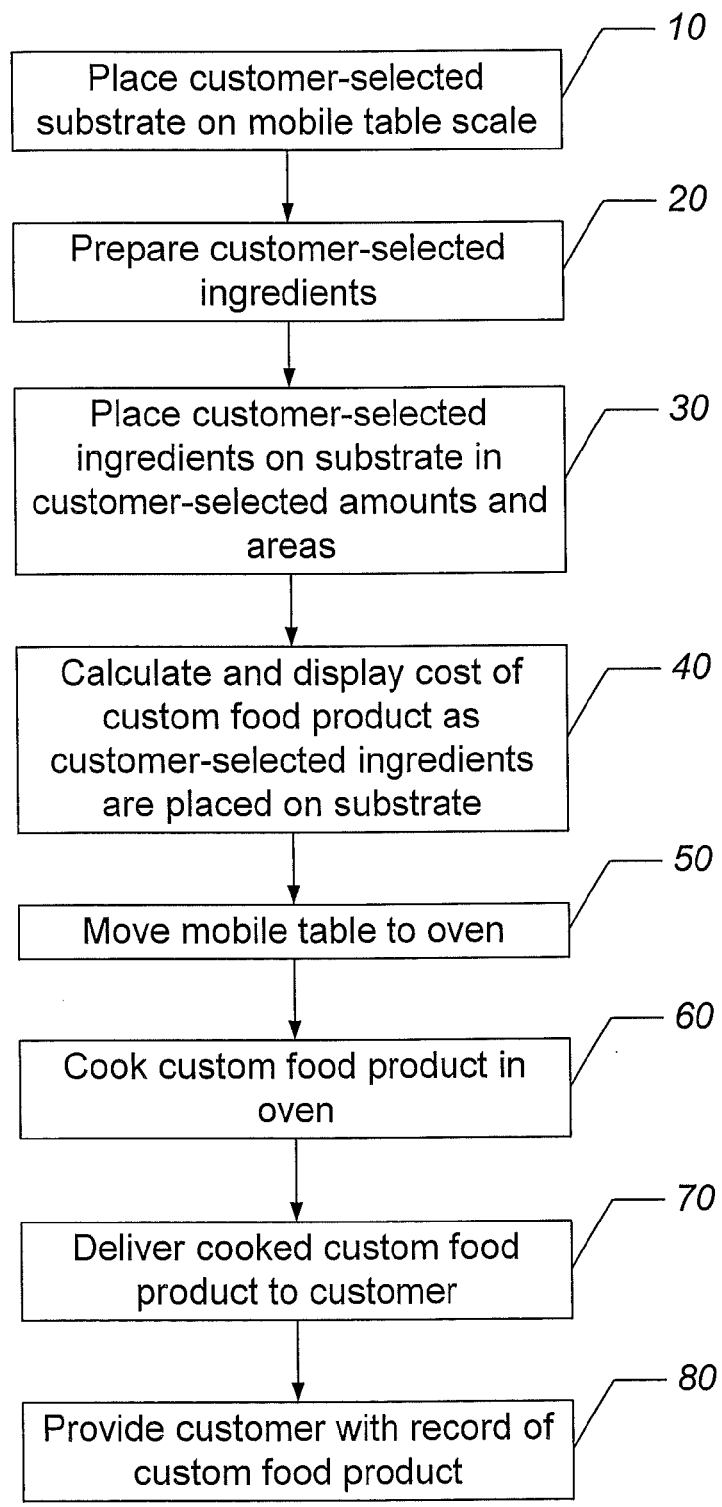
FIG. 1 is a flowchart of operations for preparing a custom food product under the direction of a customer, according to some embodiments of the present invention.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a "first" element, component, region, layer or section discussed below could also be termed a "second" element, component, region, layer or section without departing from the teachings of the present invention. The sequence of operations (or steps) is not limited to the order presented in the claims or figures unless specifically indicated otherwise.

Referring to FIG. 1, a method of preparing a custom food product at a customer's dining table and under the direction of a customer is illustrated. The custom food product is prepared on a table having a scale that is configured to weigh ingredients placed thereon that are used to prepare the custom food product. The table includes storage compartments that contain ingredients necessary to prepare the custom food product, and may include a rack for displaying certain ingredients (e.g., salami, etc.). According to some embodiments of the present invention, the table may include a food processing device for preparing fresh ingredients. For example, the food processing device may include an apparatus for slicing, chopping, dicing various ingredients. As such, various ingredients can be grated and/or sliced just prior to being used. The table also includes a data processor that is in communication with the scale and that is configured to calculate the cost of the custom food product based on the type and weight of the ingredients as the custom food product is being prepared.

Initially, a customer selects a substrate and the substrate is placed on the scale (Block 10). The substrate selected depends on the type of custom food product being prepared, For example, if the custom food product is a salad or a dessert, the substrate may be a plate or tray, or some similar container. If the custom food product is a pizza, the substrate is a pizza dough crust. Similarly, if the custom food product is a panzerotti or some other type of food product utilizing dough, the substrate is pre-formed dough. The term "comestible base" is used herein to refer to any edible material that may be used in preparing a food product and that may serve as a base for receiving ingredients. For example, with respect to a pizza, a pizza dough crust is a comestible base. With respect to a panzerotti, dough is a comestible base.

Customer-selected ingredients may be prepared (Block 20) prior to use. For example, a pepperoni may be removed from a rack suspended above the table and sliced by a food processing device. At the direction of the customer, ingredients from one or more of the table storage compartments (or other location) are placed on the substrate in customer-selected amounts and in customer-selected areas (Block 30). For example, if the custom food product is a pizza, the customer selects whatever ingredients he/she desires and directs a waitperson attending the customer how and where to distribute the ingredients on the pizza crust. The customer can direct the ingredients to be placed in any location, order and density.

Each ingredient is assigned a cost per unit of weight. For example, if the custom food product is a pizza, the various potential ingredients will all be assigned a respective price per unit of weight (e.g., $1.75 per pound for pepperoni, $6.95 per pound for alligator meat, etc.). As the ingredients are placed on the substrate, the cost of the custom food product is calculated and displayed via a display associated with the table (Block 40). Accordingly, a customer can see the price of the custom food product as it is being prepared.

If the custom food product requires cooking, the custom food product preparation table is moved, for example, to an oven (Block 50) and the custom food product is inserted within the oven and cooked (Block 60). The cooked food product is then returned to the customer's table (Block 70) by a waitperson.

According to some embodiments of the present invention, the customer may be provided with a record of the composition of ingredients of the custom food product (Block 80). The record may include an image of the custom food product and may include a name selected by the customer. For example, if the custom food product is a pizza, the customer may select to have an image of the pizza before and/or after cooking. The one or more images of the pizza may be accompanied by a list of ingredients that went into the making of the pizza, including, for example, the amount of ingredients and the location of the ingredients on the pizza, the order of placement of ingredients on the pizza, etc. According to some embodiments of the present invention, the list of ingredients and/or image(s) could be stored in a database for future ordering by this or other customers.

Figure 2:
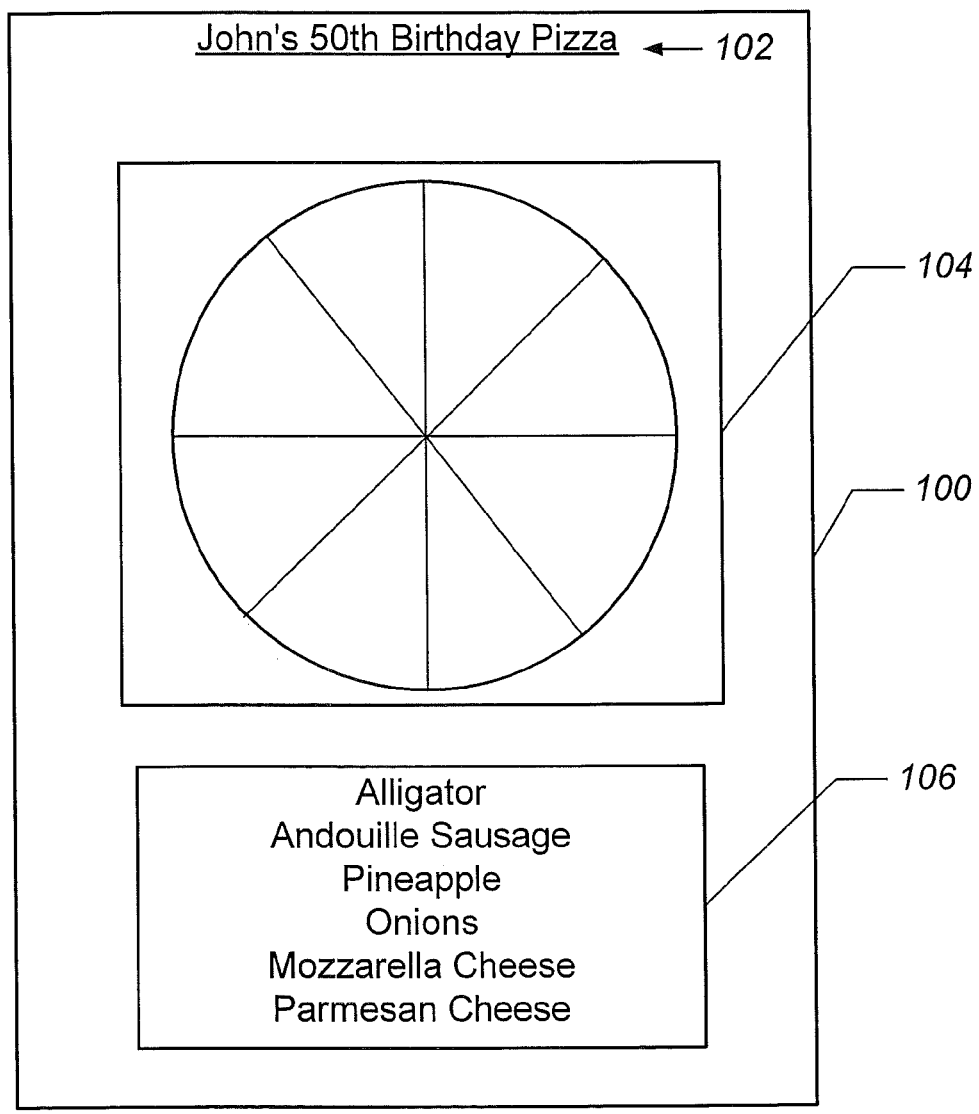
FIG. 2 illustrates a record of a custom food product, according to some embodiments of the present invention.

FIG. 2 illustrates an exemplary record 100 of a custom food product, according to some embodiments of the present invention. In the illustrated embodiment, the custom food product is a pizza and the record 100 includes a customer selected name ("John's 50$^{th}$ Birthday Pizza") 102, an image 104 of the pizza and a listing of the ingredients 106. Embodiments of the present invention are not limited to the illustrated record 100. As described above, a record may include one or more images of a custom food product, and the record may include additional information about the ingredients and the custom food product (e.g., cooking temperature, cooking duration, specific information about the types of ingredients, etc.). In addition to providing the record 100 to the customer, a restaurant may choose to place the record on a wall thereof, or otherwise display the record, as a promotional act.

Figure 3:
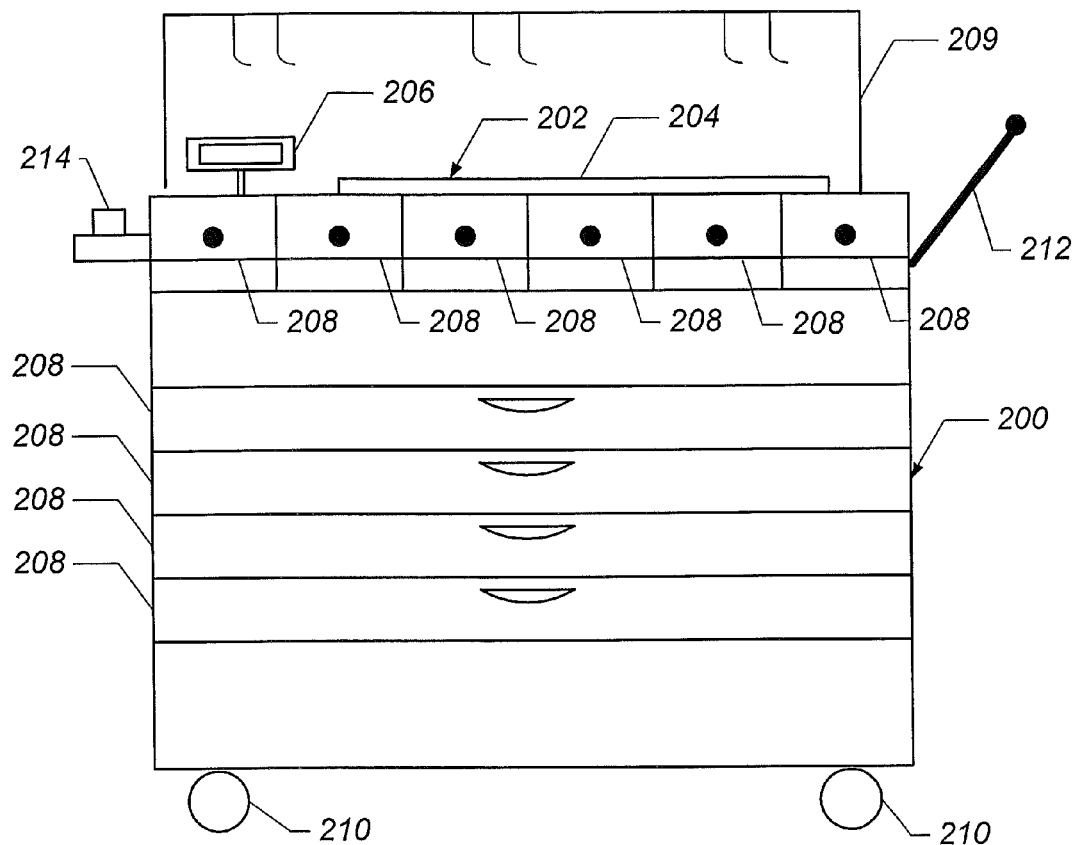
FIG. 3 is a side view of a custom food product preparation table, according to some embodiments of the present invention.

Referring to FIG. 3, a custom food product preparation table 200, according to some embodiments of the present invention, is illustrated. The table 200 includes a scale 202 having a food preparation surface 204. The scale 202 is configured to weigh ingredients placed on a substrate and/or directly on the surface 204. For example, if the substrate is a pizza crust, the scale weighs the individual ingredients placed on the pizza crust. If the substrate is a plate and the custom food product is a salad or dessert, the scale determines the net weight of the individual ingredients placed on the plate. The table 200 includes a data processor (not shown) that is in communication with the scale and that is configured to calculate the cost of a custom food product based on the type and weight of ingredients used in preparing a custom food product. The table 200 includes a display 206 that is in communication with the data processor and that displays the cost of a custom food product as ingredients are placed on the food preparation surface and/or on a substrate thereon. Accordingly, a customer can view the cost of a custom food product as it is being prepared. If the cost exceeds what the customer wants to pay, for example, ingredients can be removed from the custom food product until the price reaches the desired amount. Similarly, a customer can increase the amount of one or more ingredients to reach a target cost amount.

The illustrated table 200 also includes a plurality of storage compartments 208 that contain ingredients necessary to prepare a custom food product. The illustrated table 200 includes storage compartments of various types including drawers and receptacles accessed via pivotal doors. According to some embodiments of the present invention, one or more of the storage compartments 208 include a sensor that notifies the data processor when ingredients have been removed therefrom. As such, the data processor automatically knows what ingredients are being used and can automatically display the price of each ingredient as the food product is being prepared.

According to some embodiments of the present invention, one or more of the storage compartments 208 may include a sensor that is configured to detect when an ingredient amount in the storage compartment drops below a threshold amount. Each sensor is in communication with the data processor and the data processor is configured to send an electronic message (e.g., wirelessly, etc.) to an inventory location that an ingredient needs to be replenished in a particular storage compartment 208. For example, as will be described below, a kitchen of a restaurant can be notified to prepare additional ingredients for a storage compartment 208 of the table 200.

The illustrated table 200 also includes a storage rack 209 from which various ingredients can be suspended. For example, salamis, pepperonis, sausages, etc., can be suspended from the rack 209. When a customer selects an ingredient suspended from the rack 209, the ingredient can be removed and sliced, grated, copped etc., via the food processing apparatus 214.

The illustrated table 200 also includes wheels 210 and a handle 212 that enable the table to be rolled between locations. For example, as will be described below, the table 200 may be rolled between dining tables in a restaurant. Embodiments of the present invention are not limited to a table having wheels. A custom food preparation table, according to embodiments of the present invention, can be moved in various ways, including sliding, the use of conveyors, etc.

The illustrated table 200 also includes an ingredient grating and slicing apparatus 214. Accordingly, various ingredients can be grated and/or sliced just prior to being placed on a substrate during the preparation of a custom food product, thereby facilitating the appearance of "freshness" of ingredients. The ingredient grating and slicing apparatus 214 may be permanently attached to the table 200 or may be removably secured to the table 200. For example, the ingredient grating and slicing apparatus 214 may be a portable apparatus that is removably mounted to the table 200 and that can be removed therefrom for use. The ingredient grating and slicing apparatus 214 may be an electric device and may receive electric power from the table, for example.

The storage compartments 208 and rack 209 of the illustrated table 200 are configured to be easily removed and cleaned since routine cleaning of the table 200 will be necessary. For example, the storage compartments 208 and rack 209 may be easily removed and placed within a dishwasher for cleaning. Other aspects of the table 200 may be configured to facilitate easy cleaning of the table 200.

Embodiments of the present invention are not limited to the illustrated custom food preparation table 200. Custom food preparation tables, according to embodiments of the present invention, may have various shapes and sizes, storage compartments of various shapes, sizes and numbers, and may have more than one scale for weighing ingredients.

Figure 4:
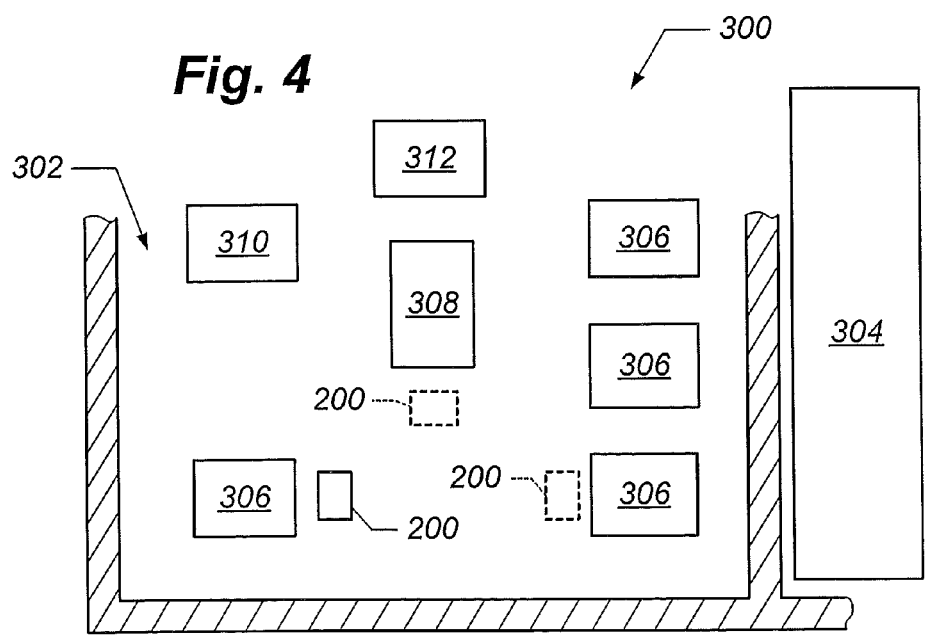
FIG. 4 is a plan view of the layout of a restaurant, according to some embodiments of the present invention.

Referring now to FIG. 4, a plan view of the layout of a restaurant 300, according to some embodiments of the present invention, is illustrated. The illustrated restaurant 300 includes a dining area 302 and a kitchen area 304. A plurality of dining tables 306 and an oven 308 are located within the dining area, as illustrated. A mobile custom food product preparation table 200, as described above, is illustrated at one dining table 306. The table 200 is configured to be rolled between the dining tables 306 and the oven 308. As described above, one or more of the storage compartments (208, FIG. 3) of the table may include sensors that detect when an ingredient in a storage compartment needs to be replenished. The table is configured to send an electronic message, for example wirelessly, to a receiver in the kitchen area 304 that additional ingredients need to be prepared for the table 200.

The illustrated restaurant 300 also includes a cashier station 310 that is in communication with the table data processor and that is configured to provide a customer with a record (100, FIG. 2) of a custom food product, as described above. For example, as a customer pays his/her bill, the customer may be presented with a record 100 of the custom food product.

The illustrated restaurant 300 also includes a take-out pizza preparation and pickup station 312. Food products can be custom-produced at the take-out pizza and pickup station 312 in a similar fashion as described above.

EXAMPLE

Customers enter a dining area and are seated, as in a typical restaurant, and a waitperson takes drink orders. A menu is handed out, which depicts the various different styles and sizes of pizza crusts available. Also pictured is the vast array of different cheeses and toppings available to complete the pizza. Instead of a bread basket, a basket of samples of crust types is presented to aid in pizza crust selection. Cheese samples could also be provided. The diners ponder the menu over drinks and appetizers, if desired.

Rather than simply give an order to the waitperson, a tableside pizza preparation cart is rolled up to the table. The waitperson begins by reviewing the different sauces, crust styles and sizes. When the customers have decided on the style, size and number of pizzas, the waitperson begins construction of the pizza(s) by pulling out the desired crust type and size and placing it on a scale on the cart. The customers then begin to select toppings, which the waitperson either freshly prepares (e.g., slices pepperoni, grates cheese, etc.) or removes from compartments on the cart (e.g., olives, anchovies, etc.), and spreads on the pizza crust in the desired quantities in desired areas. For example, a group of customers may agree that tomatoes and ham cover the entire pizza, but anchovies and jalapeno peppers are only applied to one small segment. As the waitperson has a particular topping compartment open, the scale hardware/software will weigh and apply the appropriate price for the topping being applied, and record the selections. For example, mushrooms at one price, sirloin steak strips at another. The customers can create as many pizzas as desired, simultaneously or sequentially.

Once the pizza is complete with all toppings to the customers' satisfaction, the waitperson takes the pizza to an attractive, centrally located wood-fired oven for cooking. In addition to pizzas, panzerottis and other food products can be similarly constructed at the customers' table. Of course, rather than being put into a pizza oven, the panzerotti would be folded over and baked accordingly. When finished, the pizza is returned to the table to the joyful anticipation of the diners.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A custom food product preparation table, comprising:
   a scale having a food preparation surface, wherein the scale is configured to weigh ingredients placed thereon;
   a plurality of storage compartments that contain all of the ingredients used to prepare a custom food product, wherein each storage compartment contains one or more of the ingredients;
   a data processor in communication with the scale that is configured to calculate the cost of a custom food product based on the type and weight of ingredients as the custom food product is being prepared; and
   a display in communication with the data processor that displays in real time the cost of a custom food product as ingredients are placed on the food preparation surface.

2. The table of claim 1, wherein the table comprises wheels and is configured to be rolled between locations.

3. The table of claim 1, wherein the table includes an ingredient grating and slicing apparatus.

4. The table of claim 1, further comprising a sensor that is configured to detect when an ingredient amount in a storage compartment drops below a threshold amount, and wherein the data processor is configured to send an electronic message to an inventory location that the ingredient needs to be replenished in the storage compartment.

5. The table of claim 1, wherein the table comprises a rack that supports ingredients.

6. The table of claim 1, wherein the data processor is configured to produce a physical record of a custom food product prepared on the food preparation surface, wherein the record comprises a printed listing of user-selected ingredients and amounts, and time and temperature information for cooking the custom food product, and wherein the data processor is configured to produce a printed image of an actual custom food product as prepared in the presence of a customer.

* * * * *